3,664,847
PROCESS FOR PREPARING INSTANT
CORN GRITS
Roy G. Hyldon, Crystal Lake, Ill., assignor to The
Quaker Oats Company, Chicago, Ill.
No Drawing. Filed Jan. 14, 1970, Ser. No. 2,940
Int. Cl. A23l 1/10
U.S. Cl. 99—83     4 Claims

ABSTRACT OF THE DISCLOSURE

Instant corn grits are prepared by a process comprising the steps: (A) admixing corn grits, critical amounts of water, and critical amounts of polysaccharide gum; (B) rapidly heating the mixture to a critical temperature for a critical time period; (C) immediately drying the heated mixture in the form of a thin sheet on a drum drier; and (D) collecting and comminuting the cooked dried sheet.

BACKGROUND OF THE INVENTION

Field of the invention

This invention pertains to a process for producing an improved instant food product of the corn grits type and the product produced by such process.

Description of the prior art

My invention constitutes a new and improved instant-type food product and process for a corn grits type product. It has heretofore been known that certain additives can be added to cooked and dried grain products to make them "instant" in nature, i.e. not requiring a cooking step by the consumer. Among these additives are the use of polysaccharide gums in processed oats to make instant oatmeal. Inclusion of polysaccharide gums or other additives in normally prepared corn grits products has failed to provide an instant product which would have the characteristics of normally prepared corn grits unless the grits are coprocessed with an emulsifier at a relative high temperature before a drum drying step is reached. When an emulsifier has been used to produce the desired result, the amount of such emulsifier must be carefully controlled depending on the particle size distribution of the corn grits present. My invention provides a new process for producing instant corn grits which has the advantage of shorter processing time as well as elimination of a costly emulsifier ingredient.

SUMMARY OF THE INVENTION

It is an object of this invention to produce an instant corn grits product which may be prepared as corn grits by the mere addition of warm water to the product in a serving bowl.

It is another object of this invention to provide an insant grits product which upon the addition of warm water acquires the texture and flavor characteristics of conventionally cooked corn grits.

It is another object of this invention to produce a corn grits product free of emulsifier.

It is still another object of this invention to provide a process for producing an instant corn grits wherein said process does not depend upon the use of added emulsifiers.

It is still a further object of this invention to provide a process for providing an instant corn grits product.

These objects are accomplished by a process which comprises admixing corn grits, critical amounts of water and critical amounts of polysaccharide gum, rapidly heating the mixture to a temperature of from 71° C. to 100° C. within 30 seconds of the time the corn grits, water, and gum are substantially mixed together, immediately drying the heated mixture in the form of a thin sheet on a drum drier and collecting the dried sheet of product and comminuting it to form an instant-type product.

More particularly, the polysaccharide gums used in this invention must be capable of hydrating rapidly with the addition of water and must be edible. Edible polysaccharide gums include both true gums of vegetable origin and synthetic gums such as carboxymethylcellulose, methyl cellulose, and other cellulose derivatives which approximate the vegetable gums in physical and chemical properties. Both types of gums are acceptable for use in this invention.

"True gums" are gums of vegetable origin which are soluble in water or swell in contact with water to form viscous colloidal solutions. They are insoluble in oils, alcohol, benzene and other organic solvents.

A general classification of such gums is as follows:

(A) Plant gums—dried extrudates from certain trees or shrubs in the form of tears, flakes or annular fragments that have been formed by bark fissures or incisions. The more important ones include acacia (gum arabic), Australian, Cape, carmania, gedda, ghatti, karaya, mesquite, mogadore, Persian shiraz, talha and tragacanth. Others of lesser importance include amrad, angico, apricot, brea, cashew, cebil, cedar, chagual, cherry, damson, jeol, mango, plum and sassa.

(B) Plant mucilages—derived from seeds, roots, or other plant parts usually by extraction with water. This class includes gums derived from althea root, chia seed, Iceland moss, linseed (flaxseed), slippery elm bark and guar gum.

(C) Mucilaginous materials known as hydrophylic colloids obtained from two general groups of brown and red algae. This class includes agar, Irish moss (carrageen) and algin.

When the source material for the gum is acidic, i.e. algin and Irish moss, the commercially available edible gum is a derivative of the acid such as a soluble salt or ester, i.e. propyelne glycol ester of alginic acid. In general, to be satisfactory, any gum employed must be edible, have no undesirable flavor, and disperse rapidly in hot water.

The concentration of the polysaccharide gum is critical. The polysaccharide gum must be present in an amount of from 0.5 to 3.5 percent by weight of the finished corn grits product and preferably from 1.0 to 3.0 percent by weight of the finished corn grits product.

It is contemplated, alternatively, that mixtures of the aforementioned gums may be employed instead of a single gum as long as the critical levels of gum are maintained.

My new and unique process consists of the steps:

(A) Admixing (1) corn grits,
(2) water, said water being added in an amount sufficient to cause the moisture content to be from 50 percent to 90 percent by weight of the total mixture,
(3) an edible polysaccharide gum capable of rehydrating rapidly with the addition of water, said gum being added in an amount of from 0.5 to 3.5 percent by weight of the finished corn grits product;

(B) Rapidly heating the above mixture to a temperature of from 71° C. to 100° C., said heating being accomplished within 30 seconds of the time the corn grits, water, and gum are substantially mixed together;

(C) Immediately drying the heated mixture in the form of a thin sheet on a drum drier, said drying being substantially accomplished within 2.5 minutes of the time the corn grits, water, and gum are substantially mixed together; and (D) Collecting the dried sheet of product containing discrete particles in a starch-gum matrix and comminuting the dried sheet to form an instant-type corn grits product.

The elimination of an emulsifier in my new process is accomplished by a rapid heating step followed by an immediate drying step. The heating step of my process consists of rapidly heating the corn grits, water, and gum mixture to a temperature of from 71° C. to 100° C., and preferably from 93° C. to 100° C., with said heating being accomplished within 30 seconds of the time the corn grits, water, and gum are substantially mixed together. If the critical time period of this heating step is substantially exceeded, the starch in the corn grits will gelatinize to the extent that the mixture will become a solid mass and cannot be formed in a thin sheet on the drum drier. It is, therefore, absolutely necessary that the critical temperature-time relationship be adhered to.

The rapid heating step of my new process must be followed immediately by the drying of the heated mixture in the form of a thin sheet on a drum drier. I have found it sufficient if a substantial portion of the heated mixture, i.e. greater than 80%, is dried within a time period of about 2.5 minutes from the time that the corn grits, water, and gum are substantially mixed together.

I have found that any of the commercially available comminuting machines are acceptable for comminuting the cooked and dried sheet of discrete particles in a starch-gum matrix. It is preferred, however, that the comminution be such that the product has the following particle size distribution according to a Ro-Tap particle size distribution analysis:

10 minutes on Ro-Tap

| | Weight percent |
|---|---|
| On a #12 | <1 |
| Through a #12 and on a #16 | 17–25 |
| Through a #16 and on a #20 | 37–43 |
| Through a #20 and on a #30 | 14–19 |
| Through a #30 and on a #40 | 4–7 |
| Through a #40 | <20 |

NOTE: # refers to U.S. sieve numbers.

While the above is a preferred particle size distribution for the comminuted product, any particle size distribution which will give approximately the same hydration rate as the above distribution will be acceptable.

In addition to making my product instant in nature, my unique process has awarded me several other benefits. First, the combination of thickening agent and critical temperature range provides a mixture which will form a sheet on a drum drier. By "drum drier" I intend to mean any endless plate which can be heated from a side opposite the side contacted by the product. A good example of a "drum drier" which may be used in my new process may be found in U.S. Pat. 3,478,439. Normally, one would not attempt to use a drum drier to dry a mixture of discrete particles in a starch-gum matrix. This is so because the discrete particles would cause voids or tears in the attempted sheet, resulting in an uneven mass rather than a thin, continuous and consistent sheet which would be subjected to uniform drying and heat treatment. My unique combination of additive and temperature treatment has made possible the drying of the product on a drum drier which gives me the desired properties of my product.

By the term "drying" as used herein, I intend to mean reducing the water content to below 15 percent by weight.

The product, as formed on the drum drier, preferably has a thickness of from 0.015 to 0.030 inch. This can be accomplished by setting the space between the drums at from 0.15 to 0.030 inch.

Another distinct advantage of my process is that it is successful for corn grits from a wide variety of sources. Ordinarily, corn grits vary in makeup (fat content, etc.) depending on the location from which they are produced and the processing employed in making the grits. As a result of this, processess involving corn grits normally require major alteration to adjust to the changes in the grits. I have found, however, that no adjustment is necessary for my process regardless of the size or particle size distribution of the corn grits. While some prior processes have an emulsifier to overcome problems associated with particle size distribution of the grits, this costly and time consuming step has been made unnecessary by my new and unique process.

Still another advantage of my new combination of additive and temperature treatment becomes apparent after the product is prepared for use. When conventional corn grits are prepared in large quantities and stored on a steam table or the like to keep them warm until serving, they soon become an adhesive mass or cake and lose the texture associated with grits. My new process, however, has provided a corn grits product wherein the forming of an adhesive mass or cake is postponed several hours. This results in a product which retains the grits texture for the longest of normal serving times for the product.

By the term "corn grits" in reference to my new improved food product, I intend to refer to particles of the endosperm of corn which have been subdivided to the extent that not less than 95 percent by weight of the particles pass through a No. 10 sieve and not more than 20 percent by weight of the particles pass through a No. 25 sieve.

By the term "instant" in reference to my food product, I intend to refer to a product which can be prepared in a bowl by mere addition of water and without a cooking step by the consumer. I have thus provided a product which eliminates the cooking pan and extensive cooking time required for conventional corn grits. While room temperature water (about 25° C.) can be added to my product to rehydrate it, it is preferred to use boiling water as this requires less time and provides a product at the temperature normally preferred.

The product of my invention is different from the product made by inclusion therein of emulsifiers. This difference is most dramatically illustrated by a comparison of the density of the two products. If the process uses emulsifiers to obtain a product, the volume of a normal 24 gram serving of the grits (before water is added to the bowl) will be about ¼ cup which is a density of about 1536 grams per gallon. The product produced by my new process, however, has a volume of about ⅓ cup for a 24 gram serving which is a density of about 1152 grams per gallon. My new product is therefore about 25% less dense than prior known products.

My new and unique process results in a product which cannot be produced more economically by any other method. Simple mixing of the ingredients fails to produce an acceptable product. Likewise, simple mixing of the ingredients and cooking in a pan or oven fails to produce an acceptable product. Also, my new and unique process eliminates the many problems associated with the necessary inclusion in the prior art of critical amounts of carefully controlled emulsifiers. Therefore, I have invented a new and useful product which can be produced only by my new and unique process.

My new and unique product can only be described by relation to the new and unique process which I have discovered. My new product, therefore, may best be described as the product produced by my new process.

DESCRIPTION OF PREFERRED EMBODIMENTS

This invention will be further illustrated but is not limited by the following examples and preferred embodiment. Example 1 may be taken to constitute the preferred embodiment of my invention.

Example 1

A metering system can be employed to mix corn grits, carboxymethylcellulose (CMC 7HOF, Hercules, Inc.), and water at room temperature and immediately inject the mixture into a steam injector. The metering system is adjusted such that the mixture is comprised of 100 parts by weight water, 50 parts by weight corn grits, and 0.028 part by weight carboxymethylcellulose. Steam is injected rapidly into the mixture as it passes through the steam injector and within about 20 seconds of the time that the materials are mixed together the mixture has a temperature of 95° C. The mixture at the 95° C. temperature is immediately deposited in the trough of a drum drier. Within about 2 minutes of the time that the mixture reaches the 95° C. temperature substantially all of the mixture is passed through the nip of the drier. The heated mixture forms a thin sheet on the internally heated rotating double drum drier and the product is then removed in a thin sheet having a thickness of about 0.025 inch and comminuted to the particle size of corn grits.

Example 2

Example 1 is repeated with the exception that the polysaccharide gum is guar gum (Jaguar J2S1, Stein, Hall and Co., Inc.).

While carboxymethylcellulose and guar gum are the only gums illustrated in my examples, it is to be understood that any of the aforementioned polysaccharide gums or combinations thereof can be substituted for the gums illustrated by way of example.

The products of Examples 1 and 2 can be tested as instant corn grits by employing the following recipe:

Place ⅓ cup (about 24.0 grams) of the corn grits product of this invention in a bowl. Pour ½ cup water (preferably boiling) over the product and stir until blended. Season to taste. In each of the above cases, the products will be found to have the taste and texture characteristics of normally prepared corn grits. Examples 1 and 2 are in accordance with this invention.

Example 3

Example 1 is repeated except the polysaccharide gum is left out. The product will not form a sheet on the drum drier.

Example 4

Example 1 is repeated except the temperature of the grits-water-thickening agent mixture was held at 90° C. for 10 minutes before the mixture was placed on the drum drier. The product will become so thick that it will not form a sheet on the drier, and consequently an acceptable product will not be produced.

Examples 3 and 4 are not in accordance with this invention and are advanced merely to illustrate the criticality of the polysaccharide gum and processing time-temperature conditions.

It may thus be seen that I have invented a new and unique process which produces a new and useful product and which overcomes the problems left unsolved by the prior art.

Therefore, I claim:

1. A process for producing an emulsifier free, instant-type food product which upon the addition of water and without need for heating to boiling temperatures acquires the flavor and texture characteristics of cooked corn grits, said process consisting of the steps:
    (A) admixing
        (1) corn grits,
        (2) water, said water being added in an amount sufficient to cause the moisture content to be from 50 percent to 90 percent by weight of the total mixture,
        (3) an edible polysaccharide gum capable of rehydrating rapidly with the addition of water, said gum being added in an amount of from 0.5 to 3.5 percent by weight of the finished corn grits product;
    (B) rapidly heating the above mixture to a temperature of from 71° C. to 100° C., said heating being accomplished within 30 seconds of the time the corn grits, water, and gum are substantially mixed together;
    (C) immediately drying the heated mixture in the form of a thin sheet on a drum drier, said drying being substantially accomplished within 2.5 minutes of the time the corn grits, water, and gum are substantially mixed together; and
    (D) collecting the dried sheet of product containing discrete particles in a starch-gum matrix and comminuting the dried sheet to form an instant-type corn grits product.

2. A process according to claim 1 wherein the edible polysaccharide gum that is added is carboxymethyl cellulose.

3. A process according to claim 1 wherein the edible gum that is added is guar gum.

4. A process as in claim 1 wherein the rapid heating step is to a temperature of from 93° C. to 100° C.

References Cited

UNITED STATES PATENTS 3,526,512   9/1970   Collins et al. _____ 99—83

RAYMOND N. JONES, Primary Examiner